United States Patent
Newby

(10) Patent No.: US 11,487,345 B2
(45) Date of Patent: Nov. 1, 2022

(54) TECHNOLOGIES FOR REDUCING POWER CONSUMPTION IN ACCESS CONTROL DEVICES BASED ON DELIVERY SCHEDULING

(71) Applicant: Schlage Lock Company LLC, Carmel, IN (US)

(72) Inventor: David I. Newby, Plainfield, IN (US)

(73) Assignee: Schlage Lock Company LLC, Carmel, IN (US)

( * ) Notice: Subject to any disclaimer, the term of this patent is extended or adjusted under 35 U.S.C. 154(b) by 276 days.

(21) Appl. No.: 16/735,896

(22) Filed: Jan. 7, 2020

(65) Prior Publication Data

US 2021/0208667 A1 Jul. 8, 2021

(51) Int. Cl.
| | |
|---|---|
| *G06F 1/26* | (2006.01) |
| *G06F 1/3287* | (2019.01) |
| *H04L 43/10* | (2022.01) |
| *H04W 76/10* | (2018.01) |
| *H04W 84/12* | (2009.01) |
| *G06F 1/3203* | (2019.01) |

(52) U.S. Cl.
CPC ............ *G06F 1/3287* (2013.01); *H04L 43/10* (2013.01); *H04W 76/10* (2018.02); *G06F 1/3203* (2013.01); *H04W 84/12* (2013.01)

(58) Field of Classification Search
CPC ..... G06F 1/3287; G06F 1/3209; H04L 43/10; H04L 12/413; H04W 76/10; H04W 84/12; H04W 52/0206; H04W 52/0229; H04W 72/12; H04W 76/28

USPC ......................................................... 713/320
See application file for complete search history.

(56) References Cited

U.S. PATENT DOCUMENTS

| | | | | |
|---|---|---|---|---|
| 6,425,040 | B1 * | 7/2002 | Dewa | G06F 1/3203 713/300 |
| 8,665,065 | B2 * | 3/2014 | Jenkins | E05F 15/77 341/181 |
| 9,284,775 | B2 * | 3/2016 | Pimenov | E06B 9/68 |
| 9,524,601 | B1 * | 12/2016 | Dumas | G07C 9/00309 |
| 2008/0048846 | A1 * | 2/2008 | Nagai | B60R 25/406 340/426.17 |
| 2012/0249290 | A1 * | 10/2012 | Marsh | H04M 11/02 340/5.7 |
| 2017/0197586 | A1 * | 7/2017 | Kawamura | B60R 25/40 |
| 2017/0328130 | A1 * | 11/2017 | Baker | E06B 9/80 |

(Continued)

FOREIGN PATENT DOCUMENTS

| | | |
|---|---|---|
| WO | 2015023737 A1 | 2/2015 |
| WO | 2017197445 A1 | 11/2017 |

*Primary Examiner* — Volvick Derose
(74) *Attorney, Agent, or Firm* — Taft Stettinius & Hollister LLP

(57) ABSTRACT

A method of operating an access control device to reduce power consumption based on delivery scheduling according to an embodiment includes operating, by the access control device, Wi-Fi circuitry of the access control device in a low power state, waking, by the access control device, the Wi-Fi circuitry from the low power state based on a package delivery window, communicating, via the Wi-Fi circuitry of the access control device, with an access device during the package delivery window in response to waking the Wi-Fi circuitry, and operating, by the access control device, an access control mechanism in response to communicating with the access device.

17 Claims, 4 Drawing Sheets

(56) References Cited

U.S. PATENT DOCUMENTS

| | | | |
|---|---|---|---|
| 2019/0130689 A1* | 5/2019 | Baumgarte | G07C 9/00571 |
| 2019/0206157 A1* | 7/2019 | Cazalis | G07C 9/22 |
| 2020/0143611 A1* | 5/2020 | Shin | G06Q 20/40 |
| 2020/0193375 A1* | 6/2020 | Santangeli | H04L 9/0861 |
| 2020/0327757 A1* | 10/2020 | Kelley | G07C 9/00571 |

\* cited by examiner

TECHNOLOGIES FOR REDUCING POWER CONSUMPTION IN ACCESS CONTROL DEVICES BASED ON DELIVERY SCHEDULING

BACKGROUND

Certain wireless communication technologies are particularly burdensome on battery-powered devices due to their "power hungry" nature, and many battery-powered electronic locks maintain their wireless communication circuitry in a "ready to receive" or "always on" mode at all times. For example, some electronic locks maintain their Wi-Fi circuitry in such a mode in order to allow authorized users to wirelessly access the electronic lock at all times (e.g., for delivery persons to gain access to delivery packages securely in a home). However, maintaining the Wi-Fi circuitry in a "ready to receive" or "always on" mode is typically a significant drain on battery life.

SUMMARY

One embodiment is directed to a unique system and methods for operating an access control device to reduce power consumption based on delivery scheduling. Other embodiments are directed to various apparatuses, systems, devices, hardware, methods, and combinations thereof for operating an access control device to reduce power consumption based on delivery scheduling.

According to an embodiment, a method of operating an access control device to reduce power consumption based on delivery scheduling may include operating, by the access control device, Wi-Fi circuitry of the access control device in a low power state, waking, by the access control device, the Wi-Fi circuitry from the low power state based on a package delivery window, communicating, via the Wi-Fi circuitry of the access control device, with an access device during the package delivery window in response to waking the Wi-Fi circuitry, and operating, by the access control device, an access control mechanism in response to communicating with the access device.

In some embodiments, the method may further include transitioning, by the access control device, the Wi-Fi circuitry to the low power state in response to operating the access control mechanism.

In some embodiments, the method may further include transitioning, by the access control device, the Wi-Fi circuitry to the low power state in response to expiration of the package delivery window.

In some embodiments, the method may further include waking, by the access control device, the Wi-Fi circuitry from the low power state in response to a polling condition, receiving, via the Wi-Fi circuitry of the access control device, an updated package delivery schedule, and updating, by the access control device, package delivery schedule data stored on the access control device based on the received updated package delivery schedule.

In some embodiments, receiving the updated package delivery schedule may include establishing a Wi-Fi communication connection with a server and receiving the updated package delivery schedule from the server.

In some embodiments, the polling condition may include the expiration of a time period.

In some embodiments, waking the Wi-Fi circuitry from the low power state in response to the polling condition may include periodically waking the Wi-Fi circuitry from the low power state.

According to another embodiment, an access control device may include an access control mechanism; a Wi-Fi circuitry configured to be operated in a first power state and a second power state, wherein the second power state consumed less power than the first power state; at least one processor; and at least one memory comprising a plurality of instructions stored thereon that, in response to execution by the at least one processor, causes the access control device to transition the Wi-Fi circuitry from the second power state to the first power state based on a package delivery window, communicate, via the Wi-Fi circuitry, with an access device during the package delivery window in response to transition of the Wi-Fi circuitry from the second power state to the first power state, and operate the access control mechanism in response to communication with the access device during the package delivery window.

In some embodiments, the plurality of instructions may further cause the access control device to transition the Wi-Fi circuitry from the second power state to the first power state in response to operation of the access control mechanism.

In some embodiments, the plurality of instructions may further cause the access control device to transition the Wi-Fi circuitry from the second power state to the first power state in response to expiration of the package delivery window.

In some embodiments, the plurality of instructions may further cause the access control device to transition the Wi-Fi circuitry from the second power state to the first power state in response to a polling condition, receive an updated package delivery schedule via the Wi-Fi circuitry, and update package delivery schedule data stored in the memory of the access control device based on the received updated package delivery schedule.

In some embodiments, receiving the updated package delivery schedule may include establishing a Wi-Fi communication connection with a server, and receiving the updated package delivery schedule from the server.

In some embodiments, the polling condition may include the expiration of a time period.

In some embodiments, transitioning the Wi-Fi circuitry from the second power state to the first power state in response to the polling condition may include periodically transitioning the Wi-Fi circuitry from the second power state to the first power state.

According to yet another embodiment, one or more non-transitory machine-readable storage media may include a plurality of instructions stored thereon that, in response to execution by an access control device, causes the access control device to transition Wi-Fi circuitry of the access control device from a second power state to a first power state based on a package delivery window, wherein the second power state consumed less power than the first power state, communicate, via the Wi-Fi circuitry, with an access device during the package delivery window in response to transition of the Wi-Fi circuitry from the second power state to the first power state, and operate an access control mechanism in response to communication with the access device during the package delivery window.

In some embodiments, the plurality of instructions may further cause the access control device to transition the Wi-Fi circuitry from the second power state to the first power state in response to operation of the access control mechanism.

In some embodiments, the plurality of instructions may further cause the access control device to transition the Wi-Fi circuitry from the second power state to the first power state in response to expiration of the package delivery window.

In some embodiments, the plurality of instructions may further cause the access control device to transition the Wi-Fi circuitry from the second power state to the first power state in response to a polling condition, receive an updated package delivery schedule via the Wi-Fi circuitry, and update package delivery schedule data stored on the access control device based on the received updated package delivery schedule.

In some embodiments, receiving the updated package delivery schedule may include establishing a Wi-Fi communication connection with a server and receiving the updated package delivery schedule from the server.

In some embodiments, the polling condition may include the expiration of a time period.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
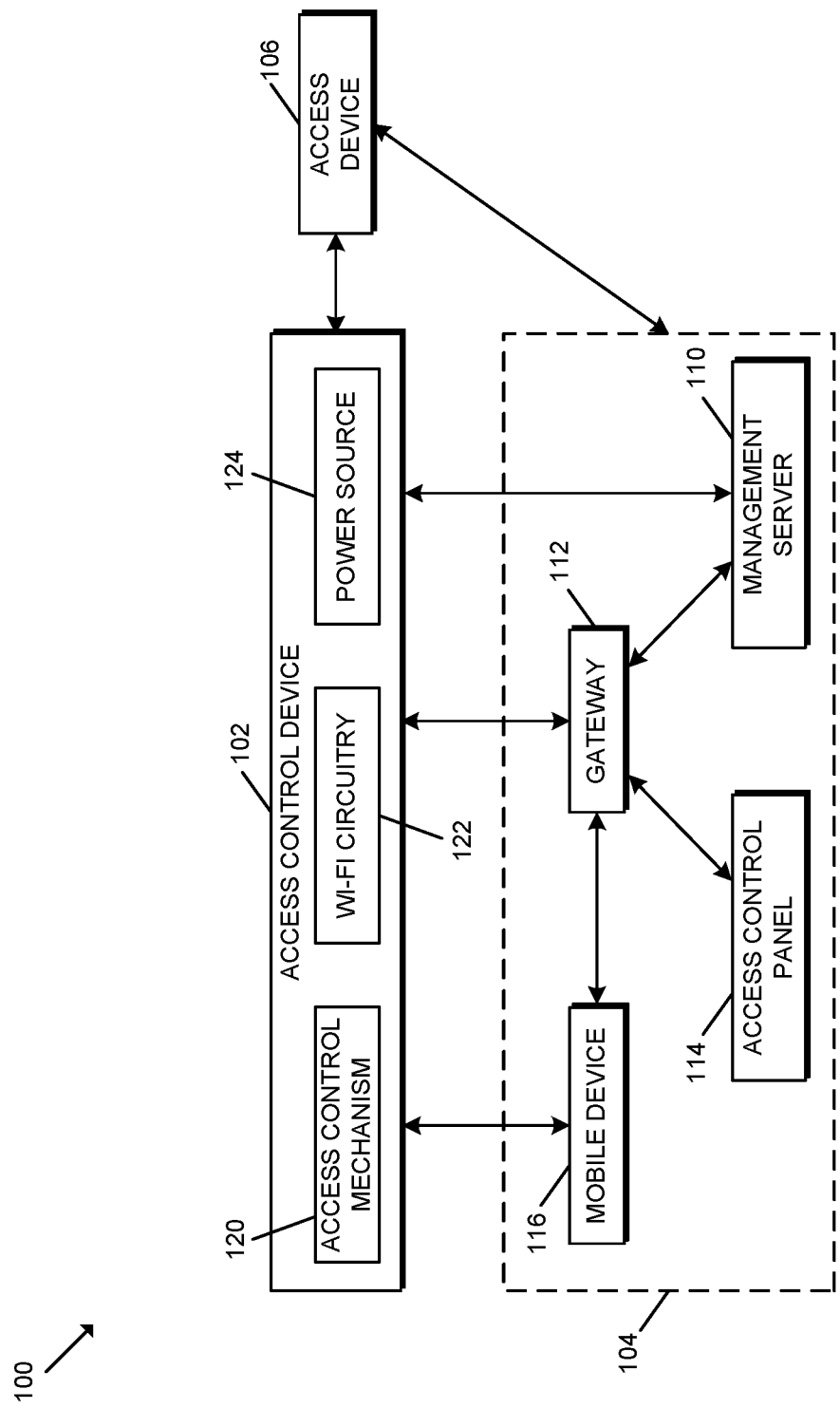
FIG. 1 is a simplified block diagram of at least one embodiment of an access control system for reducing power consumption in access control devices based on delivery scheduling.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature.

Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, an access control system 100 for reducing power consumption in an access control device based on delivery scheduling includes an access control device 102, a management system 104, and an access device 106. As shown, the management system 104 may include a management server 110, a gateway device 112, an access control panel 114, and/or a mobile device 116. Further, the access control device 102 may include an access control mechanism 120, a Wi-Fi circuitry 122, and a power source 124.

As described in detail below, in the illustrative embodiment, the Wi-Fi circuitry 122 may be transitioned between various power states (e.g., consuming different levels of power) in order to reduce the power consumption of the access control device 102. In particular, the Wi-Fi circuitry 122 may be placed in a low power state (e.g., in a low power polling mode) and may be periodically awakened from the low power state (e.g., transitioned to a different power state) to "check in" with the management system 104 to determine whether a package delivery window has been scheduled and stored to the management system 104. During the package delivery window, the Wi-Fi circuitry 122 may be placed in the higher power state (e.g., an "always on" mode) so that the access control device 102 is ready to receive communications (e.g., unlock commands) from the access device 106 (e.g., of a delivery person). After the package has been delivered, the access control device 102 may be returned to the low power state to conserve power.

It should be appreciated that the access control device 102, the management system 104, the access device 106, the management server 110, the gateway device 112, the access control panel 114, and/or the mobile device 116 may be embodied as any type of device or collection of devices suitable for performing the functions described herein. More specifically, in the illustrative embodiment, the access control device 102 may be embodied as any type of device capable of controlling access through a passageway. For example, in various embodiments, the access control device 102 may be embodied as an electronic lock (e.g., a mortise lock, a cylindrical lock, or a tubular lock) or a peripheral controller of a passageway. Depending on the particular embodiment, the access control device 102 may include a credential reader or be electrically/communicatively coupled to a credential reader configured to communicate with credential devices. As shown in FIG. 1 and described in further detail below, the illustrative access control device 102 includes an access control mechanism 120, a Wi-Fi circuitry 122, and a power source 124.

As described herein, the management system 104 may be configured to manage the package delivery schedule(s) associated with one or more access control devices 102. In doing so, the management system 104 may coordinate with one or more package delivery services and/or devices. Further, in some embodiments, the management system 104 may be configured to manage the credentials of the access control system 100. For example, the management system 104 may be responsible for ensuring that the access control devices 102 have updated authorized credentials, whitelists, blacklists, device parameters, schedules, and/or other suitable data. Additionally, in some embodiments, the management system 104 may receive security data, audit data, raw sensor data, and/or other suitable data from the access control devices 102 for management of the access control system 100. In some embodiments, one or more of the devices of the management system 104 may be embodied as an online server or a cloud-based server. Further, in some embodiments, the management system 104 may communicate with multiple access control devices 102 at a single site (e.g., a particular building) and/or across multiple sites. That is, in such embodiments, the management system 104 may be configured to receive data from access control devices 102 distributed across a single building, multiple buildings on a single campus, or across multiple locations.

It should be appreciated that the management system 104 may include one or more devices depending on the particular embodiment of the access control system 100. For example, as shown in FIG. 1, the management system 104 may include a management server 110, a gateway device 112, an access control panel 114, and/or a mobile device 116 depending on the particular embodiment. The functions of the management system 104 described herein may be performed by one or more of those devices in various embodiments. For example, in some embodiments, the management server 110 may perform all of the functions of the management system 104 described herein. Further, in some embodiments, the gateway device 112 may be communicatively coupled to the access control device 102 such that the other devices of the management system 104 (e.g., the management server 110, the access control panel 114, and/or the mobile device 116) may communicate with the access control device 102 via the gateway device 112.

In some embodiments, the access control device 102 may communicate with the management server 110 over a Wi-Fi connection and/or with the mobile device 116 over a Bluetooth and/or Wi-Fi connection. Additionally, the access control device 102 may communicate with the management server 110 and/or the access control panel 114 via the gateway device 112. As such, in the illustrative embodiment, the access control device 102 may communicate with the gateway device 112 over a Wi-Fi connection and/or a Bluetooth connection, and the gateway device 112 may, in turn, forward the communicated data to the relevant management server 110 and/or access control panel 114. In particular, in some embodiments, the gateway device 112 may communicate with the access control panel 114 over a serial communication link (e.g., using RS-485 standard communication), and the gateway device 112 may communicate with the management server 110 over a Wi-Fi connection, an Ethernet connection, or another wired/wireless communication connection. As such, it should be appreciated that the access control device 102 may communicate with the management server 110 via an offline mode (e.g., periodically or in response to an appropriate condition) in some embodiments. As indicated above, in other embodiments, it should be appreciated that the access control device 102 may communicate with the devices of the management system 104 via one or more other suitable communication protocols. As described herein, the access control device 102 may communicate with the access device 106 via a Wi-Fi connection. However, it should be appreciated that the access control device 102 may, additionally or alternatively, communicate with the access device 106 via a Bluetooth (e.g., BLE) connection or other communication connection in other embodiments.

It should be appreciated that each of the access control device 102, the management system 104, the access device 106, the management server 110, the gateway device 112, the access control panel 114, and/or the mobile device 116 may be embodied as one or more computing devices similar to the computing device 200 described below in reference to FIG. 2. For example, in the illustrative embodiment, each of the access control device 102, the management system 104, the access device 106, the management server 110, the gateway device 112, the access control panel 114, and the mobile device 116 includes a processing device 202 and a memory 206 having stored thereon operating logic 208 for execution by the processing device 202 for operation of the corresponding device.

It should be further appreciated that, although the management system 104 and the management server 110 are described herein as one or more computing devices outside of a cloud computing environment, in other embodiments, the system 104 and/or server 110 may be embodied as a cloud-based device or collection of devices. Further, in cloud-based embodiments, the system 104 and/or server 110 may be embodied as a server-ambiguous computing solution, for example, that executes a plurality of instructions on-demand, contains logic to execute instructions only when prompted by a particular activity/trigger, and does not consume computing resources when not in use. That is, the system 104 and/or server 110 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system 104 and/or server 110 described herein. For example, when an event occurs (e.g., data is transferred to the system 104 and/or server 110 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of updated access control data is made by a user (e.g., via an appropriate user interface to the system 104 or server 110), the appropriate virtual function(s) may be executed to perform the actions before eliminating the instance of the virtual function(s).

Although only one access control device 102, one management system 104, one access device 106, one management server 110, one gateway device 112, one access control panel 114, and one mobile device 116 are shown in the illustrative embodiment of FIG. 1, the system 100 may include multiple access control devices 102, management systems 104, access devices 106, management servers 110, gateway devices 112, access control panels 114, and/or mobile devices 116 in other embodiments. For example, as indicated above, the server 110 may be embodied as multiple servers in a cloud computing environment in some embodiments.

Figure 2:
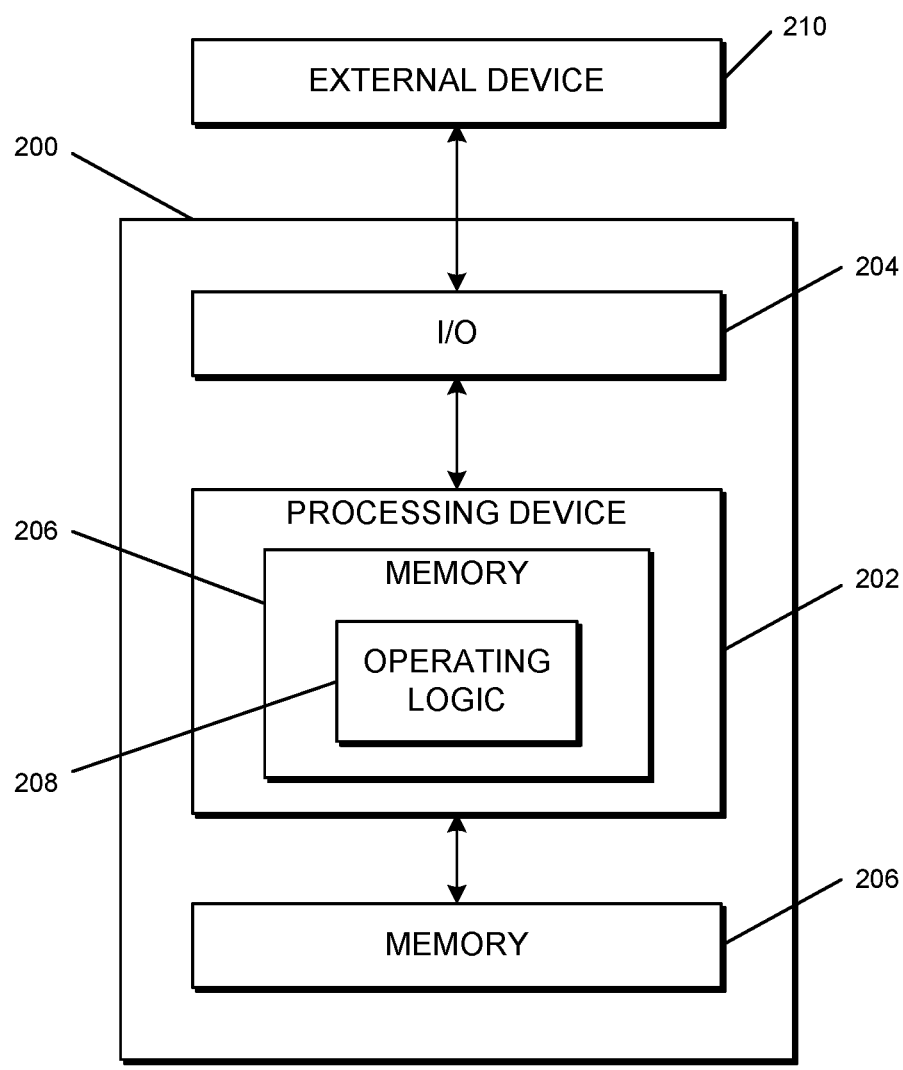
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of an access control device 102, management system 104, access device 106, management server 110, gateway device 112, access control panel 114, and/or mobile device 116 illustrated in FIG. 1. Depending on the particular embodiment, computing device 200 may be embodied as a reader device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102, the management system 104, the access device 106, the management server 110, the gateway device 112, the access control panel 114, and/or the mobile device 116. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Returning to FIG. 1, as indicated above, the illustrative access control device 102 includes an access control mechanism 120, a Wi-Fi circuitry 122, and a power source 124. The access control mechanism 120 is configured to control access through a passageway. For example, in some embodiments, the access control mechanism 120 may be embodied as a lock mechanism configured to be positioned in a locked state in which access to the passageway is denied or positioned in an unlocked state in which access to the passageway is permitted. In some embodiments, the lock mechanism includes a deadbolt, latch bolt, lever, and/or other mechanism adapted to move between the locked and unlocked state and otherwise perform the functions described herein. However, it should be appreciated that the access control mechanism 120 may be embodied as any another mechanism suitable for controlling access through a passageway in other embodiments.

The Wi-Fi circuitry 122 may include communication circuitry configured to receive and transmit wireless communication signals from remote devices via one or more antennas (e.g., an antenna array) using a Wi-Fi communication protocol. Although the techniques for reducing power consumption are described herein primarily with respect to Wi-Fi communication and the Wi-Fi circuitry 122 of the access control device 102, it should be appreciated that the access control device 102 may, additionally or alternatively, include other wireless communication circuitry (e.g., Bluetooth (e.g., including BLE), ZigBee, etc.) for which the techniques described herein may be similarly applied. It should be appreciated that the Wi-Fi circuitry 122 may be configured to operate in different power states. Each of the power states of the Wi-Fi circuitry 122 may consume a different amount of power in operation. For example, each power state may be associated with a different set of functionality of the Wi-Fi circuitry 122 depending on the particular embodiment (e.g., fully active ("always on"), idle, connected sleep, disconnected sleep, radio off, wake disabled, etc.). The number of power states of the Wi-Fi circuitry 122 or associated therewith may vary depending on the particular embodiment. One power state may be a "low power" state in the sense that it consumes less power than a fully active power state of the Wi-Fi circuitry 122. In the illustrative embodiment, the Wi-Fi circuitry 122 includes at least one power state in which Wi-Fi communication between the access control device 102 and other devices (e.g., the management system 104, the access device 106, etc.) is enabled and another power state (e.g., a low power state) in which such Wi-Fi communication is disabled. It should be further appreciated that, in some embodiments, the access control device 102 may itself have different power/operational states in which various components of the access control device 102 are enabled/disabled.

The power source 124 may be embodied as any independent power source or energy storage device capable of powering the access control device 102. In some embodiments, the power source 124 be embodied as or include one or more batteries (e.g., an alkaline, lithium ion, or other type of battery), capacitor banks, supercapacitors, and/or other energy storage devices suitable for performing the functions described herein in other embodiments. In some embodiments, the power source 124 may be rechargeable. In some embodiments, the access control device 102 relies on the power source 124 as its sole power source (e.g., it is not line powered or otherwise powered by a wired power source).

Figure 3:
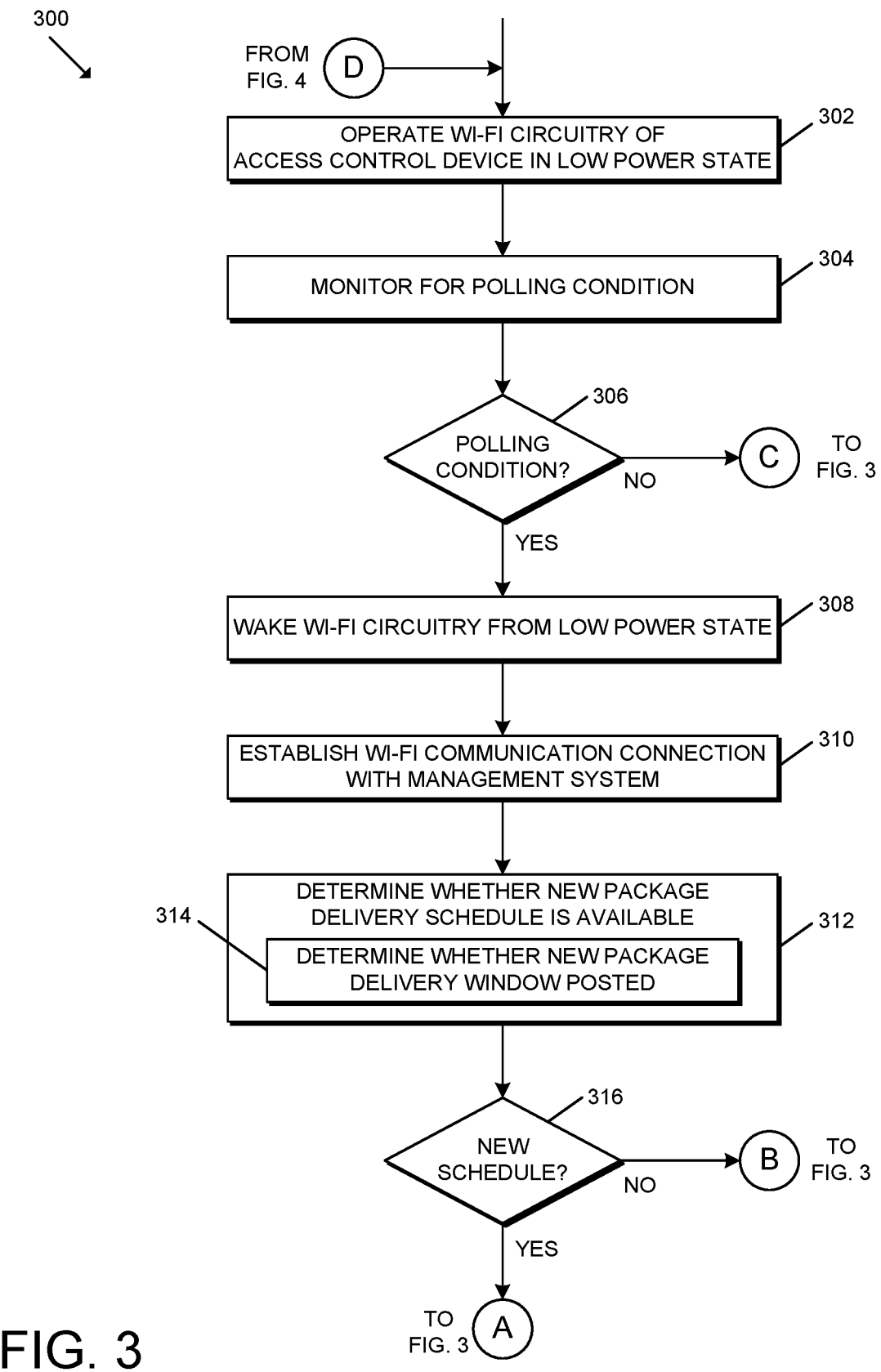
FIGS. 3-4 are a simplified flow diagram of at least one embodiment of a method of operating an access control device of FIG. 1 to reduce power consumption based on delivery scheduling.
Figure 4:
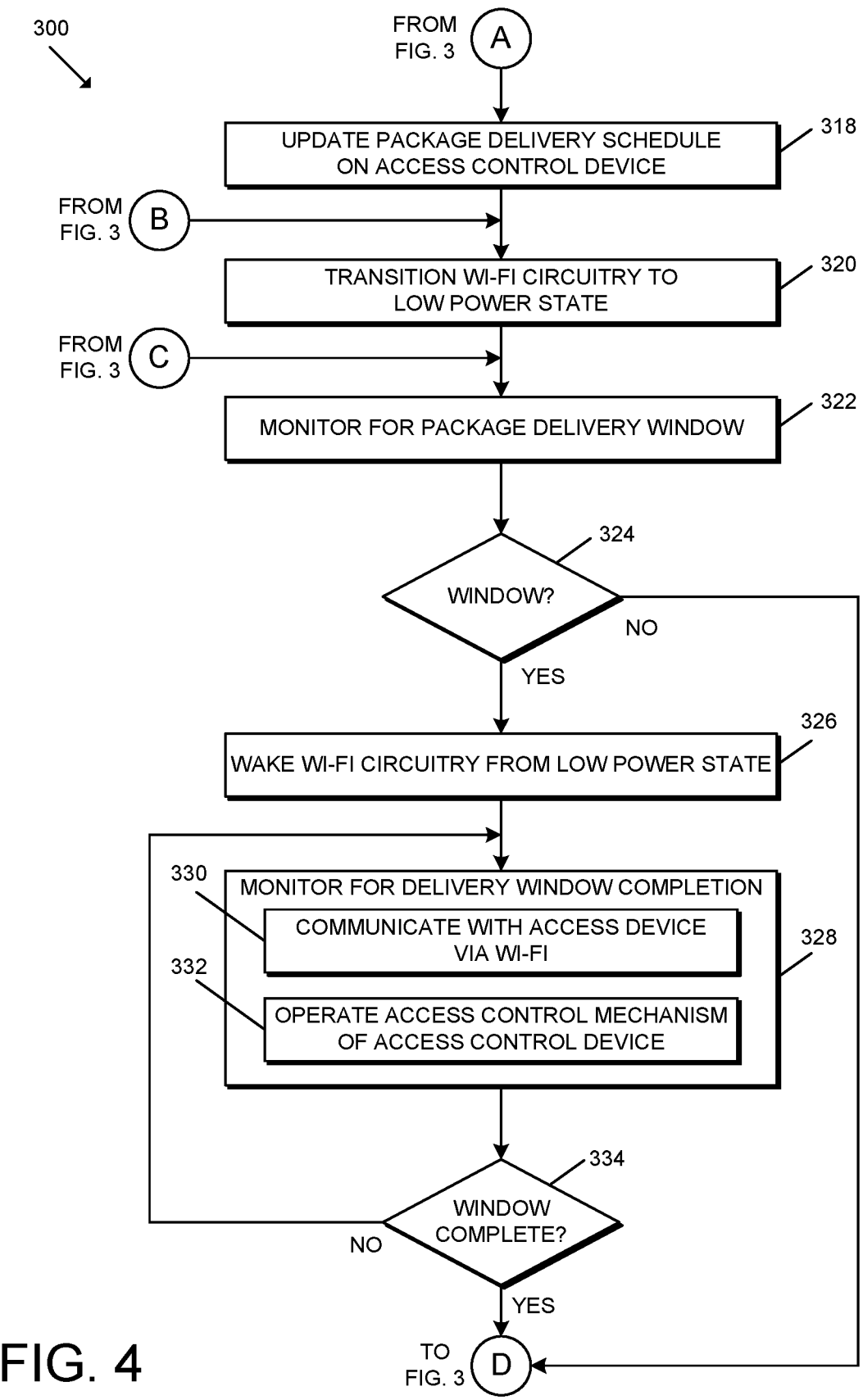

Referring now to FIGS. 3-4, in use, the system 100 or, more specifically, the access control device 102 may execute a method 300 of operating the access control device 102 to reduce power consumption based on delivery scheduling. It should be appreciated that the particular blocks of the method 300 are illustrated by way of example, and such blocks may be combined or divided, added or removed, and/or reordered in whole or in part depending on the particular embodiment, unless stated to the contrary.

The illustrative method 300 begins with block 302 of FIG. 3 in which the access control device 102 operates the Wi-Fi circuitry 122 in a low power state. It should be appreciated that the access control device 102 may continue to operate the Wi-Fi circuitry 122 in the low power state or transition the Wi-Fi circuitry 122 from a higher power state to the low power state for operation therein depending on the particular circumstances (e.g., depending on the current operational state of the Wi-Fi circuitry 122). In some embodiments, the access control device 102 may operate in a low power polling mode during which the access control device 102 cannot be directly communicated with via Wi-Fi communication. Although the access control device 102 or the Wi-Fi circuitry 122 in particular may have more than two power states in some embodiments, the method 300 describes the Wi-Fi circuitry 122 as having two power states for simplicity of the description: a low power state in which Wi-Fi communication is disabled and a higher power state in which Wi-Fi communication is enabled.

In block 304, the access control device 102 monitors for the satisfaction of one or more polling conditions. It should be appreciated that the type and/or number of polling conditions monitored by the access control device 102 may vary depending on the particular embodiment. For example, in some embodiments, the polling condition may include the expiration of a time period. In other words, the access control device 102 may be periodically notified/prompted that a time period has expired. In other embodiments, the polling condition may include or be associated with the occurrence of another event (e.g., detecting an interaction of an access device 106 with the access control device 102). In some embodiments, it should be appreciated that the polling condition may involve the satisfaction of multiple events/conditions.

If the access control device 102 determines, in block 306, that a polling condition has not occurred, the method 300 advances to block 322 of FIG. 4 in which the access control device 102 monitors for a package delivery window as described below. However, if the access control device 102 determines, in block 306, that a polling condition has occurred, the method 300 advances to block 308 in which the access control device 102 wakes the Wi-Fi circuitry 122 from the low power state (e.g., by transitioning the Wi-Fi circuitry 122 to a higher power state) to enable Wi-Fi communication.

In block 310, the access control device 102 establishes a Wi-Fi communication connection with the management system 104 and, in block 312, the access control device 102 determines whether a new package delivery schedule is available at the management system 104. In particular, in block 314, the access control device 102 may determine whether a new package delivery window has been posted in association with the access control device 102. In other words, the access control device 102 may periodically (or in response to various conditions) wake the Wi-Fi circuitry 122 from a low power state (e.g., sleep state) in order to retrieve any new or updated delivery schedule data associated with upcoming deliveries involving access to a passageway, container, or other opening secured by the access control device 102.

In some embodiments, the access control device 102 may retrieve a full delivery schedule including relevant delivery windows from the management system 104, whereas in other embodiments, the access control device 102 may simply retrieve new data from the management system 104 (e.g., newly scheduled delivery windows). Further, in some embodiments, the management system 104 may retrieve the delivery window schedule data from one or more delivery service providers (e.g., via a cloud-to-cloud or server-to-server interface). In other embodiments, the access control device 102 may, additionally or alternatively, communicate directly with the delivery service provider and retrieve the package delivery schedule data directly therefrom. In some embodiments, it should be appreciated that the delivery window schedule data may reflect multiple scheduled package deliveries. Further, in some embodiments, two or more delivery windows may overlap.

If the access control device 102 determines, in block 316, that a new package delivery schedule is available, the method 300 advances to block 318 of FIG. 4 in which the access control device 102 updates the package delivery schedule on the access control device 102 based on the updated schedule data received from the management system 104. It should be appreciated that a package delivery window may be indicative of an estimated delivery window for a particular package. Accordingly, in the illustrative embodiment, the access control device 102 may establish an internal schedule corresponding with the package delivery windows or, more generally, the package delivery schedule such that the access control device 102 is prompted to wake the Wi-Fi circuitry 122 in preparation for communication with an access device 106 for delivery of a package (i.e., if not already awaken). It will be appreciated that a delivery person may arrive outside of an estimated delivery window, and therefore, in some embodiments, the internal schedule may extend before and/or after the package delivery window itself (e.g., by a predefined amount of time as a buffer).

If the access control device 102 determines, in block 316, that a new package delivery schedule is not available, or after updating the package delivery schedule in block 318, the method 300 advances to block 320 in which the access control device 102 returns/transitions the Wi-Fi circuitry 122 to the low power state. In other words, it should be appreciated that the access control device 102 may wake/sleep the Wi-Fi circuitry 122 in a low power polling mode in order to periodically obtain updated package delivery schedule data.

In block 322, the access control device 102 monitors for an upcoming package delivery window. In particular, as described herein, the access control device 102 may include an internal schedule that prompts the access control device 102 of a package delivery window. If, in block 324, the access control device 102 detects a package delivery window, the method 300 advances to block 326 in which the access control device 102 wakes the Wi-Fi circuitry 122 from the low power state (e.g., transitioning the Wi-Fi circuitry 122 to a higher power state that enables Wi-Fi communication).

In block 328, the access control device 102 monitors for completion of the package delivery window. It should be appreciated that, in doing so, the access control device 102 may monitor for the occurrence of one or more events and/or conditions depending on the particular embodiment. For example, in block 330, the access control device 102 may communicate with an access device 106 of a delivery handler via Wi-Fi communication in order to provide access to the passageway, container, or other opening secured by the access control device 102. In doing so, it should be appreciated that the access control device 102 may receive and authenticate relevant access credential information provided by the access device 106 prior to granting access. In block 332, the access control device 102 may operate the access control mechanism 120 in order to permit access to the access device 106, whereby the package handler may, for example, deliver a package and re-secure the barrier associated with the access control device 102. In some embodiments, the successful delivery of package may constitute completion of the delivery window, whereas in other embodiments, the delivery window may remain open (i.e., not complete) until expiration of a particular time period (e.g., the end of delivery window itself). Further, in some embodiments, it should be appreciated that the access device 106 or the delivery person may not interact with the access control device 102 during such a period. Accordingly, in some embodiments, the access control device 102 may further monitor for the end of the package delivery window, expiration of a timeout period, or another period. Further, in some embodiments, multiple package delivery windows may overlap, in which case the access control device 102 may delay transitioning the Wi-Fi circuitry 122 into the low power state until the latter package delivery window is determined to be completed.

If the access control device 102 determines, in block 334, that the package delivery window is not yet completed (e.g., by virtue of a temporal limitation and/or failure of an event to occur), the method 300 returns to block 328 in which the access control device 102 continues to monitor for completion of the package delivery window. However, if the access control device 102 determines, in block 334, that the package delivery window is completed or if the access control device 102 determines, in block 324, that a package delivery window has not been detected, the method 300 returns to block 302 of FIG. 3 in which the access control device 102 transitions the Wi-Fi circuitry 122 back to the low power state.

Although the blocks 302-334 are described in a relatively serial manner, it should be appreciated that various blocks of the method 300 may be performed in parallel in some embodiments. For example, the features related to monitoring for a polling condition (e.g., periodic polling) may be performed in parallel with the features related to monitoring for a package delivery window in some embodiments.

What is claimed is:

1. A method of operating an access control device to reduce power consumption based on delivery scheduling, the method comprising:
   operating, by the access control device, Wi-Fi circuitry of the access control device in a low power state;
   waking, by the access control device, the Wi-Fi circuitry from the low power state in response to detecting an upcoming package delivery window associated with package delivery schedule data stored in an internal schedule on the access control device;
   communicating, via the Wi-Fi circuitry of the access control device, with an access device during the package delivery window in response to waking the Wi-Fi circuitry;
   operating, by the access control device, an access control mechanism in response to communicating with the access device;
   waking, by the access control device, the Wi-Fi circuitry from the low power state in response to a polling condition;
   receiving, via the Wi-Fi circuitry of the access control device, an updated package delivery schedule; and
   updating, by the access control device, the package delivery schedule data stored on the access control device based on the received updated package delivery schedule.

2. The method of claim 1, further comprising transitioning, by the access control device, the Wi-Fi circuitry to the low power state in response to operating the access control mechanism.

3. The method of claim 1, further comprising transitioning, by the access control device, the Wi-Fi circuitry to the low power state in response to expiration of the package delivery window.

4. The method of claim 1, wherein receiving the updated package delivery schedule comprises:
   establishing a Wi-Fi communication connection with a server; and
   receiving the updated package delivery schedule from the server.

5. The method of claim 1, wherein the polling condition includes expiration of a time period.

6. The method of claim 1, wherein waking the Wi-Fi circuitry from the low power state in response to the polling condition comprises periodically waking the Wi-Fi circuitry from the low power state.

7. An access control device, comprising:
   an access control mechanism;
   a Wi-Fi circuitry configured to be operated in a first power state and a second power state, wherein the second power state consumes less power than the first power state;
   at least one processor; and
   at least one memory comprising an internal schedule, and a plurality of instructions stored thereon that, in response to execution by the at least one processor, causes the access control device to:
     transition the Wi-Fi circuitry from the second power state to the first power state based on a package delivery window associated with package delivery schedule data stored in the internal schedule;
     communicate, via the Wi-Fi circuitry, with an access device during the package delivery window in response to transition of the Wi-Fi circuitry from the second power state to the first power state;
     operate the access control mechanism in response to communication with the access device during the package delivery window;
     transition the Wi-Fi circuitry from the second power state to the first power state in response to a polling condition;
     receive an updated package delivery schedule via the Wi-Fi circuitry; and
     update the package delivery schedule data stored in the memory of the access control device based on the received updated package delivery schedule.

8. The access control device of claim 7, wherein the plurality of instructions further causes the access control device to transition the Wi-Fi circuitry from the second power state to the first power state in response to operation of the access control mechanism.

9. The access control device of claim 7, wherein the plurality of instructions further causes the access control device to transition the Wi-Fi circuitry from the second power state to the first power state in response to expiration of the package delivery window.

10. The access control device of claim 7, wherein to receive the updated package delivery schedule comprises to:
    establish a Wi-Fi communication connection with a server; and
    receive the updated package delivery schedule from the server.

11. The access control device of claim 7, wherein the polling condition includes expiration of a time period.

12. The access control device of claim 7, wherein to transition the Wi-Fi circuitry from the second power state to the first power state in response to the polling condition comprises to periodically transition the Wi-Fi circuitry from the second power state to the first power state.

13. One or more non-transitory machine-readable storage media comprising a plurality of instructions stored thereon that, in response to execution by an access control device, causes the access control device to:
    transition Wi-Fi circuitry of the access control device from a second power state to a first power state based on a package delivery window associated with package delivery schedule data stored in an internal schedule on the access control device, wherein the second power state consumes less power than the first power state;
    communicate, via the Wi-Fi circuitry, with an access device during the package delivery window in response to transition of the Wi-Fi circuitry from the second power state to the first power state;
    operate an access control mechanism in response to communication with the access device during the package delivery window;
    transition the Wi-Fi circuitry from the second power state to the first power state in response to a polling condition;
    receive an updated package delivery schedule via the Wi-Fi circuitry; and
    update the package delivery schedule data stored on the access control device based on the received updated package delivery schedule.

14. The one or more non-transitory machine-readable storage media of claim 13, wherein the plurality of instructions further causes the access control device to transition the Wi-Fi circuitry from the second power state to the first power state in response to operation of the access control mechanism.

15. The one or more non-transitory machine-readable storage media of claim 13, wherein the plurality of instructions further causes the access control device to transition the Wi-Fi circuitry from the second power state to the first power state in response to expiration of the package delivery window.

16. The one or more non-transitory machine-readable storage media of claim 13, wherein to receive the updated package delivery schedule comprises to:
   establish a Wi-Fi communication connection with a server; and
   receive the updated package delivery schedule from the server.

17. The one or more non-transitory machine-readable storage media of claim 13, wherein the polling condition includes expiration of a time period.

\* \* \* \* \*